Figure 1:
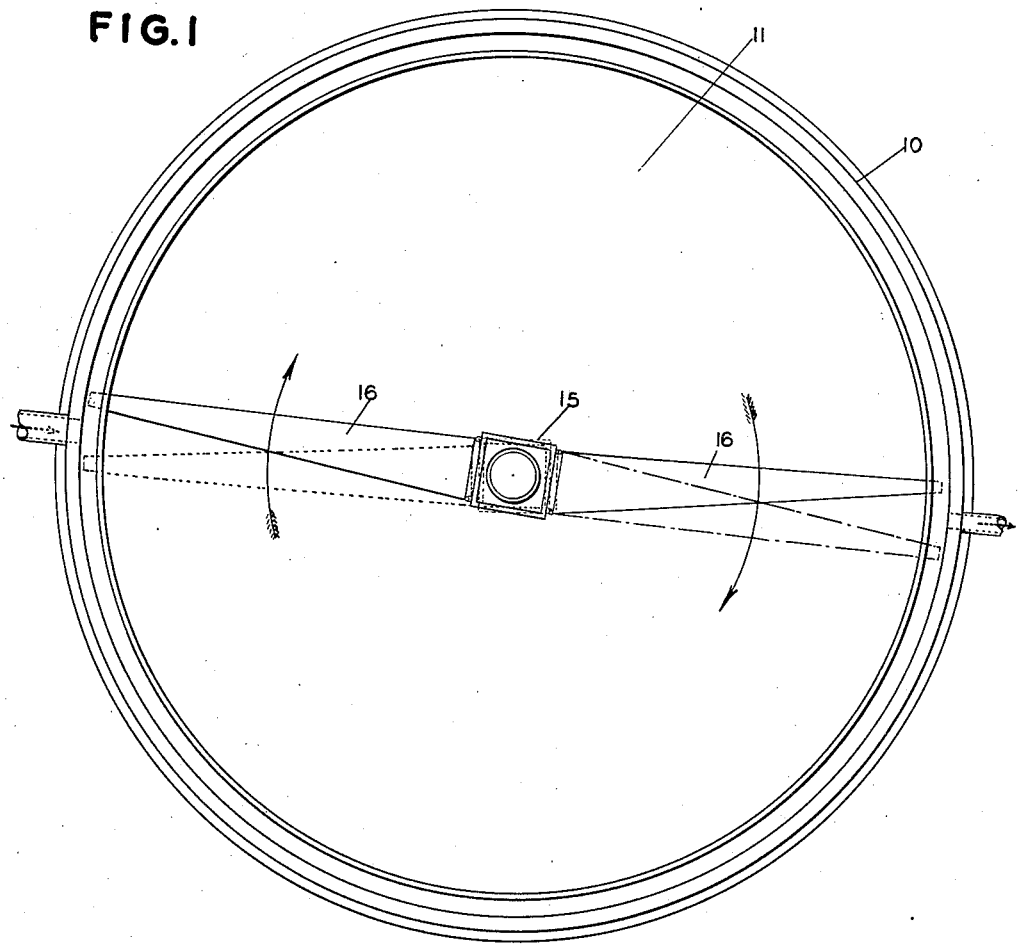

June 28, 1938.  C. H. SCOTT  2,122,383
SEDIMENTATION APPARATUS (AUTOMATIC LIFTING ARM)
Filed June 14, 1935   3 Sheets-Sheet 1

INVENTOR
CHARLES H. SCOTT
BY *Arthur Middleton*
ATTORNEY.

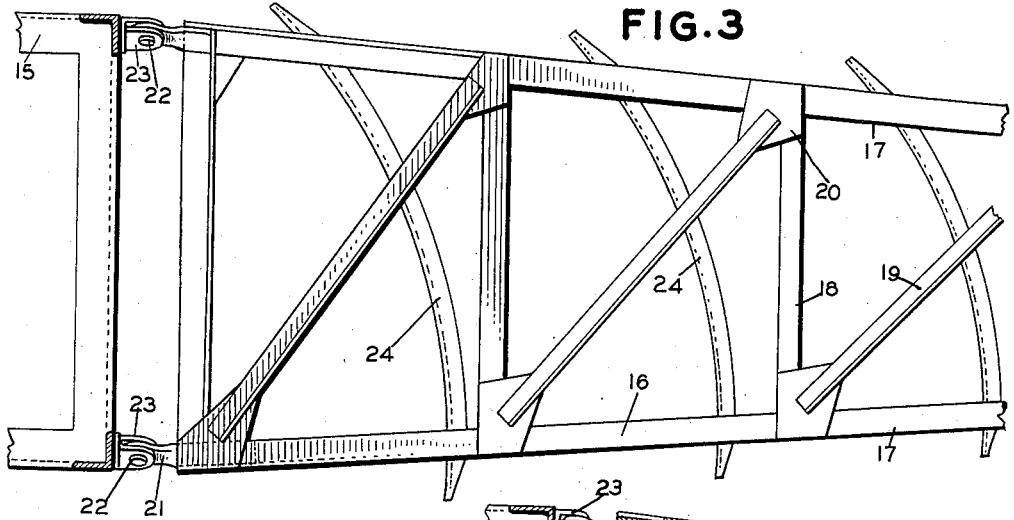
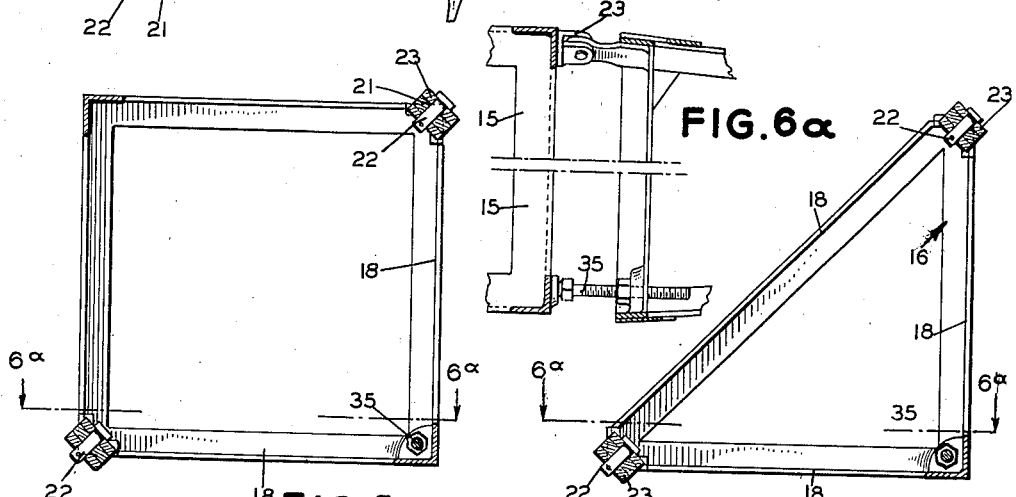
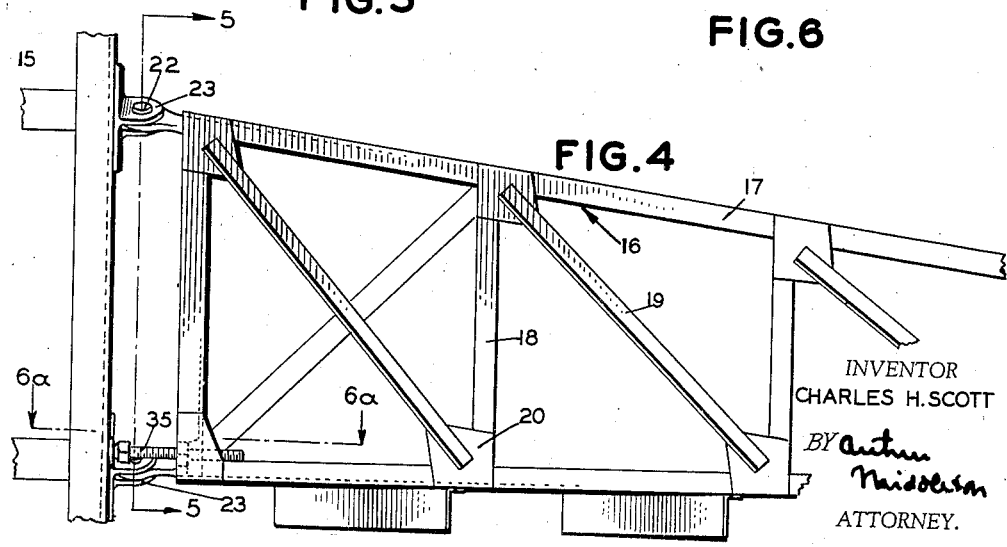

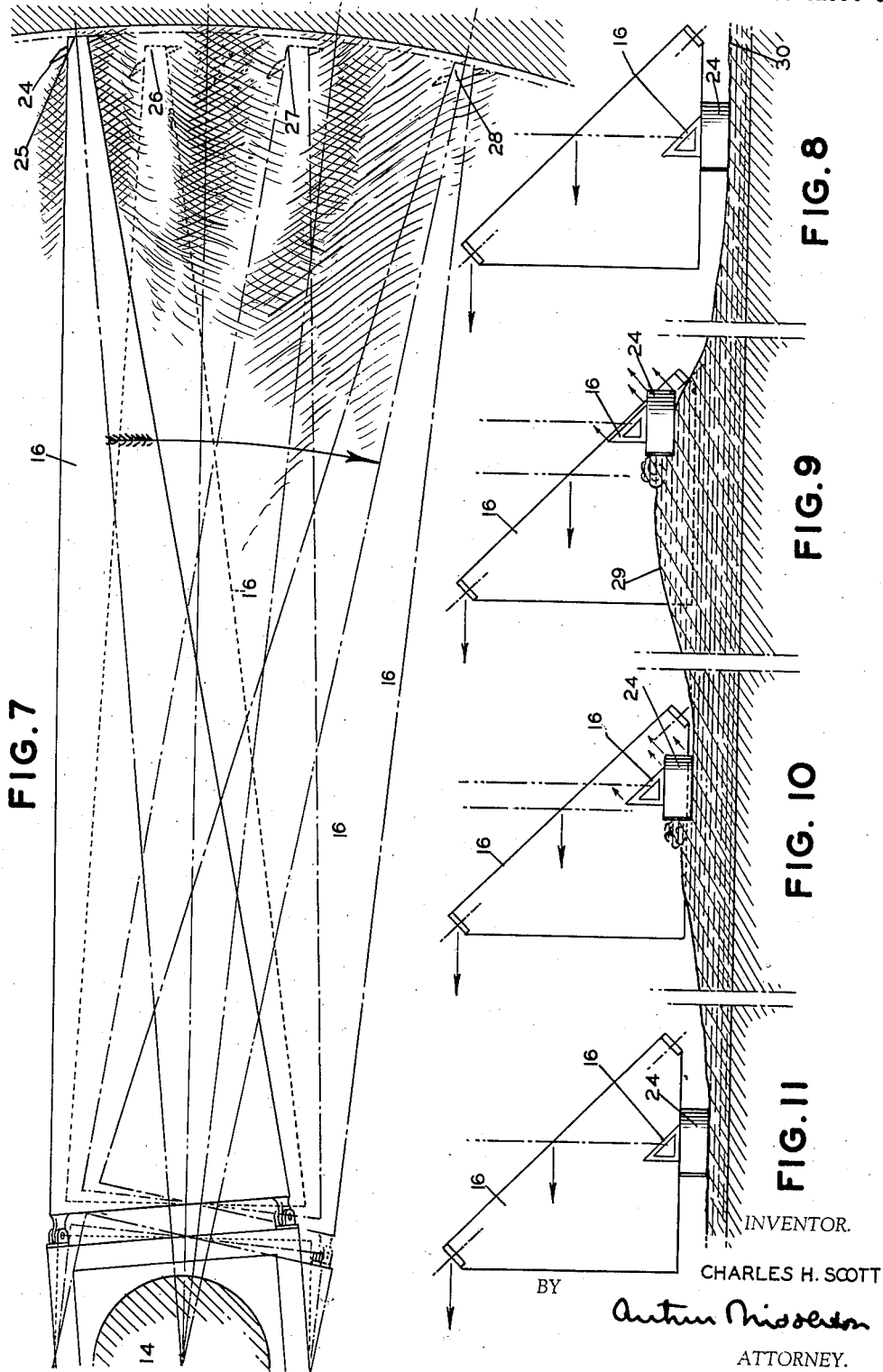

Patented June 28, 1938

2,122,383

UNITED STATES PATENT OFFICE 2,122,383

SEDIMENTATION APPARATUS (AUTOMATIC LIFTING ARM)

Charles H. Scott, Queens Village, N. Y., assignor to The Dorr Company, Inc., New York, N. Y., a corporation of Delaware Application June 14, 1935, Serial No. 26,532

6 Claims. (Cl. 210—55)

The present invention relates to sedimentation apparatus of the continuously-operating type and more particularly to an improved form of raking or scraping device for raking the settled solids in a settling tank to a discharge chamber or sump.

Sedimentation apparatus of the type referred to comprehends, for example, apparatus which is frequently referred to as clarifiers, as thickeners, as hydro-separators, or as classifiers.

In all forms of apparatus above referred to there is used traveling raking and scraping mechanism for collecting sedimented solids from diverse sections of the floor of a sedimentation tank and for transferring the solids collected thereby to a discharge section provided in the bottom of the tank. The present invention revolves about certain features respecting a novel mode of mounting and positioning an arm (or arms) carrying scraping and conveying blades and constituting essential elements, and which blade carrying arm (or arms) constitute an essential element (or elements) of the raking and scraping mechanism.

For convenience in operation, such settling tanks are often constructed cylindrical in form, and with a bottom sloping from the sides downwardly to the center. At the bottom portion is formed a solids collecting chamber, with which is connected an outlet passage through which the solids are withdrawn.

The solids, as they settle to the bottom of the tank, are scraped or raked gradually toward the center of the tank and into the discharge chamber or sump. This raking or scraping operation is performed by a device comprised ordinarily of a frame mounted for rotation on a vertical axis, and having extending radially outward therefrom a plurality of rake arms. Attached to the bottom of each of such rake arms are rakes or scrapers which, as the rake arms rotate, rake or scrape the settled solids slowly and gradually toward the center of the tank.

The operation of such solids or sludge removal devices is ordinarily continuous, but conditions may arise which prevent the removal of the sludge from the tank. In such event the scraping or raking devices are kept in operation in order to prevent them from becoming embedded in the sludge which sometimes forms an obstructing cake or gummy mass if it is not continuously agitated. If, for any reason, the power or rotating mechanism for the rotating arms fails, the scraping or raking devices stop, and become stuck or embedded in the cake or mass. Foreign substances accidentally or otherwise introduced into the tank may offer an obstruction to the raking movement of the arm.

Under such conditions it has heretofore been necessary to remove the liquid from the tank, and then remove the obstructing mass, cake or body, as the case may be, from the bottom before operations could be resumed.

In my present invention I have devised an improved form of rake carrying arm which will automatically free itself.

It is the object of my present invention to provide a raking or scraping device carrying arm which will automatically lift out of a thickened sludge bed when the power is applied thereto, or which will automatically raise should the raking or scraping blades carried on the bottom of the arms meet with an obstruction.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

Figure 2:
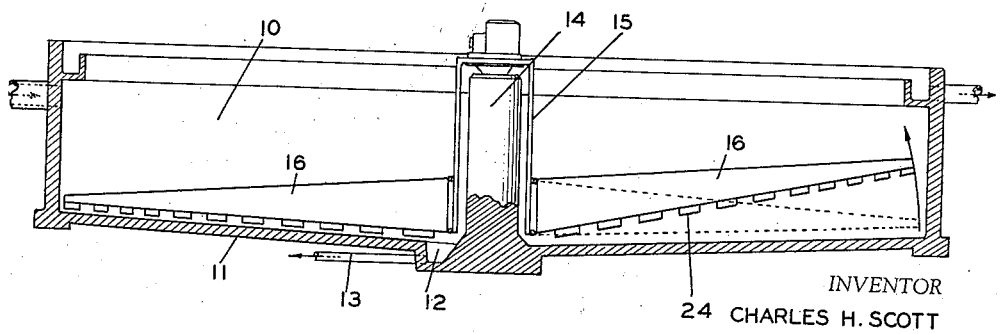

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a plan view of a settling tank, showing my device in position therein, Fig. 2 is a vertical sectional elevation of the tank shown in Fig. 1, Fig. 3 is a plan view, on an enlarged scale, of a position of a rake carrying arm, and the support on which the same is mounted, Fig. 4 is a front elevation of Fig. 3, Fig. 5 is a section on the line 5—5 of Fig. 4, Fig. 6 is a section, similar to Fig. 5, but showing a modified form of rake carrying arm, Fig. 6A is a sectional detail view of the adjustable stop construction employed, the same being a view taken as on the horizontal plane indicated by the line 6A—6A of Fig. 4, of Fig. 5 or of Fig. 6 looking in the direction of the arrows, Fig. 7 is a diagrammatic plan illustrating the operation of my device when an obstruction in the sludge bed is encountered by the rakes or scrapers, and Figs. 8, 9, 10 and 11 in the order named and read in connection with Fig. 7, illustrate the manner in which the rake arm automatically lifts.

Referring to the drawings, 10 designates a settling tank, having a sloping bottom 11, at the center of which is a discharge chamber or sump 12. Communicating with the discharge chamber 12 is an outlet pipe 13, through which sludge is removed.

Extending upwardly from the center of the bottom 11 is a pier 14, on the top of which is rotatably mounted, on a member providing a vertical axis, a framework 15. The framework 15, which is frequently referred to as an arm carrying member, extends downwardly into the tank 10, and has pivotally attached thereto a plurality of radially extending rake carrying arms 16.

The rake carrying arms 16 are preferably built in skeleton form of structural shapes, comprising the longitudinally extending members 17, tied together by the transverse members 18, diagonals 19, and gussets 20, in any approved manner. The number of longitudinals 17 may be four, as shown in Fig. 5, or three, as shown in Fig. 6. The form in which three longitudinals are employed is the preferred form. The arms 16 taper from one end to the other, and in the form where three longitudinals 17 are employed a cross section at any point along the length of the arm is in the form of a triangle, to wit, a triangle of isosceles or other suitable form. The upper portion of the triangular cross section of the arm slopes upwardly and forwardly in respect to the path of rotary movement which the arm has about a vertically extending axis hereinafter referred to.

At diametrically opposite corners the rake carrying arms 16 have attached, to the ends of the longitudinally extending members 17, bearing blades or hinge tongues 21 perforated as shown for the reception of hinge pins 22. Bearing blocks or lugs 23 are secured to the framework, and through these bearing blocks 23 there extend the bearing pins 22 by which the rake carrying arms 16 are tiltably or swingably mounted. The rake carrying arms 16 are normally rotated as an entirety about a vertically extending axis by the rotating framework 15, and are independently partially rotatable, tiltable or swingable on such framework 15, to wit, about an axis which is inclined so that it slopes forwardly and upwardly or, in other words, about an axis which is inclined so as to make an acute angle to a horizontal plane. On the lower corner of the end of the arm 16, is an adjustable stop member 35, which contacts with the framework 15 to limit the swinging movement of the framework 15.

The arms 16 rotate in the direction indicated by the arrows in Fig. 1, and the rakes or scrapers 24, carried on the bottom of the arms 16, are so arranged as to gradually move the settled solids toward the center of the tank.

The mounting of the arms 16 on the framework 15 is such that while ordinarily the arms rotate with the rakes or scrapers 24 in engagement with or close to the bottom of the tank, such arms will, upon the rakes or scrapers 24 meeting with an obstruction, have their turning movement resolved into two components. One of such components is a lifting one and tends to lift the arm so as to free the raking or scraping arms 24 from the obstruction. The other component is in a horizontal plane. The result is, therefore, that while the arms 16 are lifted over or upward with respect to an obstruction, such obstruction is gradually worn down and removed if of such character as to be removable in this manner. If, however, the obstruction is of a relatively solid character, as a rock, the arm will ordinarily ride thereover.

This action of my improved device is clearly illustrated in Figs. 7 to 11 inclusive. Referring to such figures, numerals 25, 26, 27 and 28 in Fig. 7, represent the positions of the arm 16 in Figs. 8, 9, 10 and 11 respectively, and such arms are assumed to be rotating about the pier 14 in the direction of the arrow. Figs. 8, 9, 10 and 11 represent consecutive adjacent sections of the tank bottom 11 over which the rake carrying arms 16 are passing and show an obstruction in the form of a hard mass 29 of deposited solids. Such obstruction is just appearing in Fig. 8, reaches its maximum height in Fig. 9, tapers off in Fig. 10, and gradually disappears in Fig. 11. The arm carrying the rakes or scrapers 24 is assumed in Figs. 8, 9, 10 and 11 to be moving to the left, as indicated by the arrows.

Referring to Figs. 7 and 8, the arm 16, represented by the full line outlined in Fig. 7, is moving the rake or scraper 24 over the normal surface of the sludge bed 30 in the tank 10. As the rake 24 approaches the left of Fig. 8, the beginning of the obstruction or lump 29 is encountered. As the rake carrying arm 16 moves into the dotted line outline 26 in Fig. 7, or into the position shown in Fig. 9, the resistance offered by the obstruction or lump 29 to the passage of the rake or scraper 24 will divide the turning moment of the arm 16 into two components, a lifting and a horizontal component, with the result that the arm 16 will be rotated about the diagonally located bearing pins 22 to lift the rake or scraper 24 in the manner indicated in Fig. 9.

As the peak of the obstruction or lump 29 is passed, as indicated by the dot and short dash outlined 27 in Fig. 7 and as shown in Fig. 10, the lifting component is lessened, resulting in a corresponding lowering of the arm 16.

After the arm 16 has passed the obstruction or lump 29 as indicated by the dot and long dash line 28 in Fig. 7, and as shown in Fig. 11, the lifting component will have disappeared, and the rakes or scrapers 24 now in their normal operative position will ride on and in the sludge bed 30 in the normal manner.

The same result is produced by the rake carrying arms 16, when the rakes 24 are embedded in a hard or sticky mass. As power is turned on to rotate the framework 15 about its vertical axis on the pier 14, the force exerted on the arm 16 tends to rotate the same in a horizontal plane, and in the direction of the arrow shown in Fig. 1. However, the resistance to rotation of the arm 16 because of its being embedded in the mass, will result in the outer end of the arm 16 moving upwardly, as shown in Fig. 2 in full lines. The rake carrying arms 16 will thus "ride" themselves out of the mass in which they may be embedded.

Although my invention has been described as to its use in connection with sewage treating apparatus, this is illustrative merely, and it is obvious that my invention is useful in other sedimenting operations where it is desired to rake settled solids toward an exit passage.

Further, while my invention has been illustrated and described in connection with cylindrical sedimentation tanks, its use is not to be so limited, as obviously my invention is applicable for use in a rectangular or other shaped tank and in which the raking arm will have a rectilinear movement, as distinguished from a circular movement about a fixed center.

As the result of the particular construction herein disclosed, there is provided a raking arm which automatically raises incident to an unusual obstruction or to an unduly heavy load. The outer or free end of the arm is the section having the greatest movement away from the bottom of the sedimentation tank or basin. The section of the arm nearest the center of the tank or, in other words, nearest to its point of support, has the least amount of vertical movement from the bottom of the sedimentation tank or basin and therefore stays in a more constant position for performing its work. When the load on the arm is the greatest, this section of the arm nearest the point of support continues to perform its work. Assuming the arm has been automatically raised because of an undue load thereupon, it is to be noted that the section of the arm nearest its point of support initially performs the major portion of the work, and as it accomplishes this initial portion of the work incident to the overload, the arm progressively lowers until it ultimately assumes its normal operative position, to wit, the lowermost position therefore at which it functions to collect and transfer a normal amount of solids. This operation continues until abnormal conditions are encountered, according to which the arm will automatically raise to adjust itself to a position corresponding to the abnormal load conditions encountered thereby.

The mechanism that includes the movable framework 15 and the rake carrying arm 16 with the raking blades 24 thereupon constitute essentially elements of what may be defined as a settled solids raking assemblage. The movable framework 15 has a depending rake arm carrying section thereof that extends downwardly into the body of liquid solids mixture undergoing sedimentation within the tank or basin 10.

The normal or operative level of the body of liquid undergoing sedimentation is determined by overflow launder or effluent launder sections provided at the upper interior portion of the tank.

The rake carrying arm is pivotally mounted on and at the lower submerged portion of the depending section of the movable frame 15 and normally operates in submergence. The depending section of the frame 15 upon which the rake carrying arm is pivotally mounted is therefore properly referred to as a movable submerged rake arm carrying section.

The rake arm as constructed of assembled structural shapes suitably connected or tied together is of a skeleton construction not only to attain lightness and strength, but also in order to realize a construction which can operate to perform the desired settled solids raking and conveying functions without disturbing sedimentation operations carried out within the tank. In other words, the raking construction is such that it will normally operate in undisturbing sedimentation submergence. It will be appreciated, however, should an obstructing mound be sufficiently prominent or high it might cause the outer free end of the arm to temporarily extend above the normal level of the liquid within the tank, but this should be viewed as a relatively abnormal condition or situation.

The blades providing the rakes or scrapers 24 from one point of view may be considered as connected to and as depending from the skeleton arm construction 16. From another point of view the rakes or scraper blades may be considered as embodied in and as constituting a part of the skeleton arm construction and as providing depending sections functioning as sedimented solids rakes or raking means.

It will be noted that the raking blades in respect to the forward raking movement for the carrying arm therefor have rearward and lateral inclinations, specifically rearward and inward inclinations, whereby they collectively function to effect progressive impelling or ploughing action tending to transfer settled solids along paths ultimately leading to sediment discharge section, to wit, the centrally disposed sump 12 from which the transferred solids are hydraulically conveyed through the pipe 13.

The rake carrying arm 16 may be viewed as a truss. It may be viewed as a cantilever pivotally mounted at the large or inner end thereof upon a depending section of the framework 15. The longitudinal extending members 17 are sometimes referred to as chords or main chord members arranged so that an upper member gradually approaches a lower chord member.

Each rake carrying arm has an upper main chord member providing what may be termed as an inner end section that is upwardly and forwardly located with respect to an inner end of a lower chord member that provides what may be termed as a lower and rearwardly positioned inner end section, this because of the fact that the inner end sections just referred to are both vertically and horizontally spaced and are arranged as indicated in respect to each other.

The hinge construction by which the rake carrying arms are supported may be considered as providing vertically and horizontally spaced hinges or hinge members. For each rake carrying arm there is a hinge member which is upwardly and forwardly positioned in respect to a lower and rearwardly positioned hinge member. The hinge members for a particular arm are positioned so that the pintles thereof are in alignment along a line extending downwardly and rearwardly. It will also be noted that the hinge members which are provided for each rake carrying arm and which are definable as upper forward and lower rear hinge members are located in the immediate vicinity of the inner end of the main chord member to which it corresponds.

The movable framework 15 heretofore described as having a depending rake-arm section may be viewed as a horizontally rotatable structure, section or member from which the rake-arm 16 is carried or derives support and to which the inner end portion of the rake-arm has a hinged or swinging connection through the medium of hinges arranged so that the pintle axes are in alignment along a line extending downwardly and rearwardly in respect to the forward path of the horizontally rotatable or turnable arm-supporting or arm-carrying structure.

What is claimed is:

1. A combined rake-arm and arm-carrying construction for use in a liquid-solids sedimentation zone essentially comprising a longitudinally extending front upper chord member, a longitudinally extending front lower chord member, a longitudinally extending rear lower chord member, which said chord members are suitably connected and assembled into a unitary hollow skeleton type of arm tapering in size between a larger inner end thereof and a smaller outer end thereof, longitudinally spaced sediment raking blades connecting the lowermost chord members, and vertically and horizontally spaced hinge members arranged with the pintle axes thereof in alignment, of which an upper front hinge member is connected to the rake-arm in the immediate vicinity of the inner end of the upper front chord member and a rear lower hinge member is connected to the rake-arm in the immediate vicinity of the inner end of the lower rear chord member.

2. A combined rake-arm and arm-carrying construction as defined in and by claim 1 having an adjustable screw stop functionally arranged at and carried in the immediate vicinity of the inner end of the lower front chord member; also having the raking blades relatively uniformly longitudinally spaced so that the inclinations thereof are rearwardly as well as inwardly and dimensioned so that they increase progressively in length in passing inwardly from the outer end portion of the arm.

3. A tiltable rake-arm comprising longitudinally extending upper front, lower front and lower rear main chord members tied together by transverse members so as to provide a hollow skeleton unitary form of construction tapering between the large inner end thereof and the smaller outer end, and horizontally and vertically spaced hinge members connected to the innermost end portion of the rake-arm and arranged with the pintle axes in alignment along a line inclined downwardly and rearwardly; and a series of longitudinally spaced depending raking blades carried by said arm for effecting incident to a forward raking movement of the arm the progressive impelling and transferring of sedimented solids as engaged and raked thereby; said upper forward hinge member being located in the immediate vicinity of an upper front main chord member while said lower hinge member is located in the immediate vicinity of a lower rear main chord member of the rake-arm; the rake-arm having at the inner end section thereof a stop portion provided in the immediate vicinity of the inner end of the lower front main chord member.

4. Sedimentation apparatus comprising a settling tank having a feed inlet; an effluent outlet; a sediment discharge; and mechanism for conducting sediment to discharge comprising a rotatably supported element having a framework disposed about a vertical axis, means for rotating said element, sediment impelling raking arms of skeleton construction smaller at one end than at the other including longitudinal members braced together having particularly an upper front and a lower rear longitudinal member, pivoted means for securing the larger ends of said arms to said framework adapted to effect upward and rearward yielding movement of the raking arms when encountering abnormal resistance and the automatic restoration thereof to raking position when said resistance is overcome including hinges whose pintles are aligned between the horizontal and vertical with one of said hinges located in the vicinity of said upper front member and another located in the vicinity of said lower rear member, and stop means located in advance of the lower rear longitudinal member of the arm for cooperating with said framework.

5. A sedimentation apparatus having a rotatable arm supporting structure, a hinged rake-arm which comprises an upper longitudinal main member, a front lower longitudinal main member and a rear lower longitudinal main member that are connected to one another through the medium of transverse members with the inner end section of the upper longitudinal main member being upwardly and forwardly located in respect to the inner end section of the rear lower longitudinal main member; hinges by which the hinged rake-arm is connected to the arm supporting structure arranged with the pintle axes in alignment and disposed whereby one of them is connected to the rake-arm in the immediate vicinity of the inner end of the upper longitudinal main member and whereby another of the hinges is connected to the rake-arm in the immediate vicinity of the rear lower longitudinal main member and a stop means disposed between the hinged rake-arm and the arm supporting structure.

6. A raking assemblage comprising in combination a hinged rake-arm having sediment raking and impelling means disposed along the lower portion thereof, a horizontally rotatable arm-carrying structure, and hinges at the inner end of the arm providing means by which the arm is swingably connected to the arm-carrying structure so as to permit the arm to yield and the free end thereof to swing upwardly and rearwardly from the normal operative position therefor as and when abnormal raking conditions are encountered and to thereafter gravitate to its normal operative position as and when the abnormal raking conditions have been overcome; said hinged arm comprising longitudinally extending main members and transversely extending tying and bracing members connected to provide a skeleton arm construction tapering from a deep and wide inner end to a small outer end whereby said main members provide a front lower main chord member, an upper main chord, and a rear lower main chord member wherein the inner end section of the upper main chord member is in front of a vertical line passing through the inner end section of the rear lower main chord member; one of said hinges being disposed in the vicinity of the inner end of the upper main chord member and an other being disposed in the immediate vicinity of the inner end of the rear lower main chord member whereby the pintle axes of said hinges are disposed in substantial alignment.

CHARLES H. SCOTT.